United States Patent
Ben-Yehuda et al.

(10) Patent No.: US 8,255,642 B2
(45) Date of Patent: Aug. 28, 2012

(54) AUTOMATIC DETECTION OF STRESS CONDITION

(75) Inventors: Shmuel Ben-Yehuda, Haifa (IL); Avichai Giat, Haifa (IL); Dan Pelleg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 12/629,903

(22) Filed: Dec. 3, 2009

(65) Prior Publication Data

US 2011/0138127 A1   Jun. 9, 2011

(51) Int. Cl.
*G06F 12/00* (2006.01)

(52) U.S. Cl. ........................................ 711/154

(58) Field of Classification Search .................. None
See application file for complete search history.

(56) References Cited

U.S. PATENT DOCUMENTS

| | | | |
|---|---|---|---|
| 5,630,097 A | 5/1997 | Orbits et al. | |
| 5,752,261 A | 5/1998 | Cochcroft, Jr. | |
| 5,905,509 A | 5/1999 | Jones et al. | |
| 6,026,475 A | 2/2000 | Woodman | |
| 6,438,672 B1 | 8/2002 | Fischer et al. | |
| 6,625,695 B2 | 9/2003 | Fanning | |
| 6,868,472 B1 | 3/2005 | Miyake et al. | |
| 6,874,056 B2 | 3/2005 | Dwyer et al. | |
| 7,493,464 B2 | 2/2009 | Adcock | |
| 8,064,262 B2 * | 11/2011 | Yamashita | 365/185.2 |
| 2003/0070045 A1 | 4/2003 | Dwyer et al. | |
| 2004/0213035 A1 * | 10/2004 | Cavaleri et al. | 365/154 |
| 2005/0091466 A1 | 4/2005 | Larson et al. | |
| 2007/0234003 A1 | 10/2007 | Narus | |

OTHER PUBLICATIONS

Dimitrios S. Nikolopoulos, "Malleable Memory Mapping: User-Level Control of Memory Bounds for Effective Program Adaptation", 2003. URL:http://ieeexplore.ieee.org/xpls/abs_all.jsp?tp=&arnumber=1213074&isnumber=27277.

* cited by examiner

Primary Examiner — Hiep Nguyen

(57) ABSTRACT

A stress of a computerized system may be detected based on actions performed by the computerized system in respect to a storage system, such as comprising a secondary storage. The stress detection may be performed automatically based on an age of data blocks accessed by the storage system. The stress may take into account a number of accesses to the storage system by the computerized system. Stress detection may be performed automatically based on a decision procedure.

25 Claims, 3 Drawing Sheets

AUTOMATIC DETECTION OF STRESS CONDITION

BACKGROUND

The present disclosure relates to runtime analysis of computerized systems in general, and to resource management of computerized system in particular.

Computer systems typically include a hierarchy of memory devices, ranging from large, cheap, and slow to small, expensive, and fast. Many computer systems utilize a primary memory, such as a Random Access Memory (RAM), which is fast but expensive, and a secondary memory, such as a Hard Disk, which is cheap but slow. In order to make the primary memory, which is usually small, appear as being able to store larger amount of data, a paging system may be employed.

The paging system, also referred to as swapping system, designate a portion of the secondary memory, such as a partition, a region associated with a file or the like, to store a portion of the data that should be retained by the primary memory. The data may be logically grouped in a "page". In 5-case there is not enough space in the primary region, a page may be stored in the secondary memory until it is required by the computerized device. The process of transferring the pages back and forth between hierarchy levels of the paging system is called paging, or swapping. Usage of this mechanism incurs the latency of reading or writing to the slower device, and is therefore best kept to a minimum.

The usage pattern of swapping may be determined by the mix of applications, or processes, running, their concurrency, and the amount of memory they frequently access, also referred to as a working set. If, at a given time, the sum of the working sets of the running applications is less than the amount of fast memory available, the swapping effects are minimal. However, if some applications are simultaneously trying to access working sets which sum to more than the available primary memory, the latency to the secondary memory may bottleneck the entire system. This is commonly called "thrashing".

BRIEF SUMMARY OF THE INVENTION

One exemplary embodiment of the disclosed subject matter is a computerized apparatus having a processor comprising: an access tracker configured to retain a temporal indication associated with an access to a storage system; and a stress analysis module configured to automatically indicate a stress level of the storage system, the stress analysis module utilizes the temporal indication retrained by the access tracker.

Another exemplary embodiment of the disclosed subject matter is a method in a computerized environment comprising a storage system, the method comprising: retaining a temporal indication associated with a write access to the storage system; identifying a read access to the storage system, the read access having a time of read access; determining a stress level of the storage system based on the time of read access and the temporal indication; and outputting an indication associated with the stress level, whereby the write access and the read access are transformed to the stress level, the stress level is indicative of a likelihood of thrashing of a computerized device utilizing the storage system.

Yet another exemplary embodiment of the disclosed subject matter is a computer program product comprising: a computer readable medium; a first program instruction for retaining a temporal indication associated with a write access to the storage system; a second program instruction for identifying a read access to the storage system, the read access having a time of read access; and a third program instruction for determining a stress level of the storage system based on the time of read access and the temporal indication, wherein the first, second and third program instructions are stored on the computer readable medium.

Yet another exemplary embodiment of the disclosed subject matter is a computerized apparatus having a processor, wherein the computerized apparatus is coupled to a storage system, the storage system is utilized by a platform virtualization, the computerized apparatus comprising: an access tracker configured to retain a temporal indication associated with a first access to the storage system, wherein the temporal indication comprises a timestamp associated with a storage time of the storage system, wherein the access tracker comprising an access counter and a block age determinator; a filtering module configured to identify a second access to the storage system which is associated with a non-swapping activity, wherein the filtering module is utilized by the access tracker, the filtering module comprising: a page size comparer; a swapping storage identifier; and a user data region identifier; a stress analysis module configured to automatically indicate a stress level of the storage system, the stress analysis module utilizes the temporal indication retrained by the access tracker, wherein the stress analysis module comprising a decision procedure module configured to determine the stress level; a stress reducer module configured to reduce stress from the storage system; and an output module configured to provide an output to a user indicating the stress level determined by the stress analysis module.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
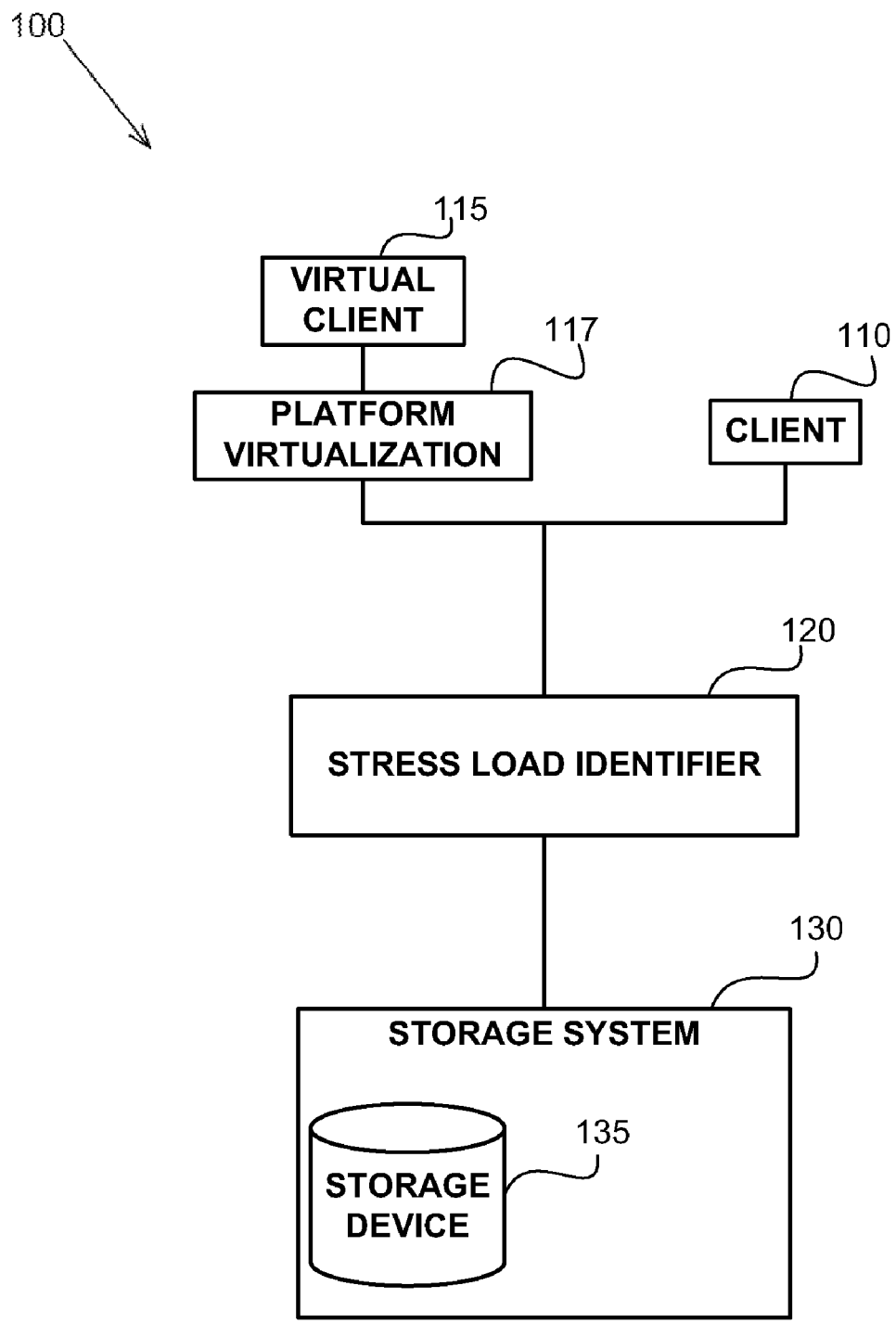
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to automatically determine a stress level of a computerized system utilizing a storage system. Another technical problem dealt with by the disclosed subject matter is to determine the stress level of a computerized system, without having access to the swapping mechanism. Yet another technical problem dealt with by the disclosed subject matter is to provide an out-of-band method to detect a stress level of a computerized system. Yet another technical problem is an out-of-band method to detect that thrashing is taking place in a computerized system utilizing a storage system.

One technical solution is to track usage of a storage system associated with a paging system. Another technical solution is to determine an age of an accessed data block to identify an increase of swapping operations. Yet another technical solution is to provide a decision procedure to determine a stress level based on information gathered during tracking, such as age of data blocks and count of accesses to the storage system.

One technical effect of utilizing the disclosed subject matter is transforming meta-data associated with a storage system to be indicative of an operation of a computerized device utilizing the storage system. Another technical effect is enabling a platform virtualization system to automatically detect trashing of a computerized server providing computation services to the platform virtualization system. Yet another technical effect is providing an opportunity to perform an operation to reduce stress level or reduce thrashing of the computerized device.

Referring now to FIG. 1 showing a computerized environment in which the disclosed subject matter is used, in accordance with some exemplary embodiments of the subject matter. A computerized environment 100 may comprise a client 110 and a storage system 130.

The storage system 130 may be a storage system utilized by the client 110 in a paging system. The storage system 130 may comprise a storage device to retrain data such as a hard disk, a flash memory, a non-volatile memory device, a Redundant Array of Inexpensive Disks (RAID), a Storage Area Network (SAN), Network Attached Storage (NAS), remote storage device or the like. In some exemplary embodiments, a predetermined portion of the storage device 135 is utilized for storing pages, such as for example a swapping file, a swapping partition or the like. In some exemplary embodiments, another predetermined portion of the storage device 135 may not be utilized for storing pages, such as for example a user data region.

The client 110 may be a computerized device, such as a desktop, a laptop, a Personal Digital Assistant (PDA), a mobile device, a smart phone, a computerized process which may comprise tasks, an Operating System (OS), a multi-process operating system, platform virtualization 117 or the like. The client 110 may utilize the storage system 130 to store data, such as user data, swapping data, system files or the like. In some exemplary embodiments, the client 110 is connected to the storage system 130 through a stress load identifier 120. The client 110 may be unaware of the presence of the stress load identifier 120, which may provide a proxy service of the storage system 130. In some exemplary embodiments, multiple clients similar to client 110 may access the storage system 130 via the stress load identifier 120

In some exemplary embodiments, a virtual client 115 may utilize the platform virtualization 117. The platform virtualization 117 may provide a virtual machine for the virtual client 115. The platform virtualization 117 may be, for example, VMware, Xen or the like. The platform virtualization 117 may utilize the storage system 130 as a storage of the virtual machine. For example the platform virtualization 117 may utilize the storage system 130 as a secondary storage. It will be noted that in some exemplary embodiments virtualization may be utilized to provide increase in utility of a common resource. For example, in case a CPU utilization of a computer system by a OS is low, as may be expected to be on most cases, several instances of an OS may utilize the computer system, such as for example a server. However, it is common that an OS may utilize a significant portion of a primary memory, such as RAM, of the computer system. Therefore, a risk of thrashing in the computer system serving multiple virtual clients 115 may be significant. It is noted that in some exemplary embodiments the client 110 is a virtual client, such as 115.

In some exemplary embodiments, the stress load identifier 120 may identify a stress level of a computerized system, such as the client 110, utilizing the storage system 130. The stress load identifier 120 may be configured to provide a notification in case a stress level is outside a level, such as for example above a predetermined threshold, below a threshold or the like. The notification may be sent to a user (not shown), an administrator (not shown) of the client 110 or the like. The notification may be sent to a computerized device configured to provide an action to reduce the stress load. In some exemplary embodiments, the notification may be sent in case the stress load is indicative to the client 110 thrashing.

In some exemplary embodiments, a stress level may be reduced by terminating an application of the client 110, rebooting the client 110, adding a primary memory to the client 110, such that the client 110 may require less swapping operations, attaching additional memory to the virtual client 115 or the like.

It will be noted that in some exemplary embodiments of the disclosed subject matter the client 110 may be a computerized server or the like which may not have a terminal, may be accessed via a network, may not be inspected by a person frequently or the like. In such exemplary embodiments, the stress load identifier 120 may detect thrashing that would be otherwise hard to detect by a user of the client 110. For example, in case the client 110 is a remote server, a user of the client 110 may be located remotely from the client 110 and may not be able to distinguish whether a slow performance of the client 110 is caused due to thrashing, network load or the like.

In some exemplary embodiments, the stress load identifier 120 may be implemented in the storage system 130. The stress load identifier 120 may be implemented in a storage solution, such as for example NAS and SAN, a controller or a driver of the storage system 130, a virtualization software, such as for example the platform virtualization 117 and a hypervisor, or the like. The stress load identifier 120 may allocate resources, such as primary memory, to itself, such as for example in case the stress load identifier 120 is implemented in the platform virtualization 117, it may allocate RAM to itself, also referred to as pinning, and thus may not be affected by adverse affects of thrashing of the virtual client 115.

Figure 2:
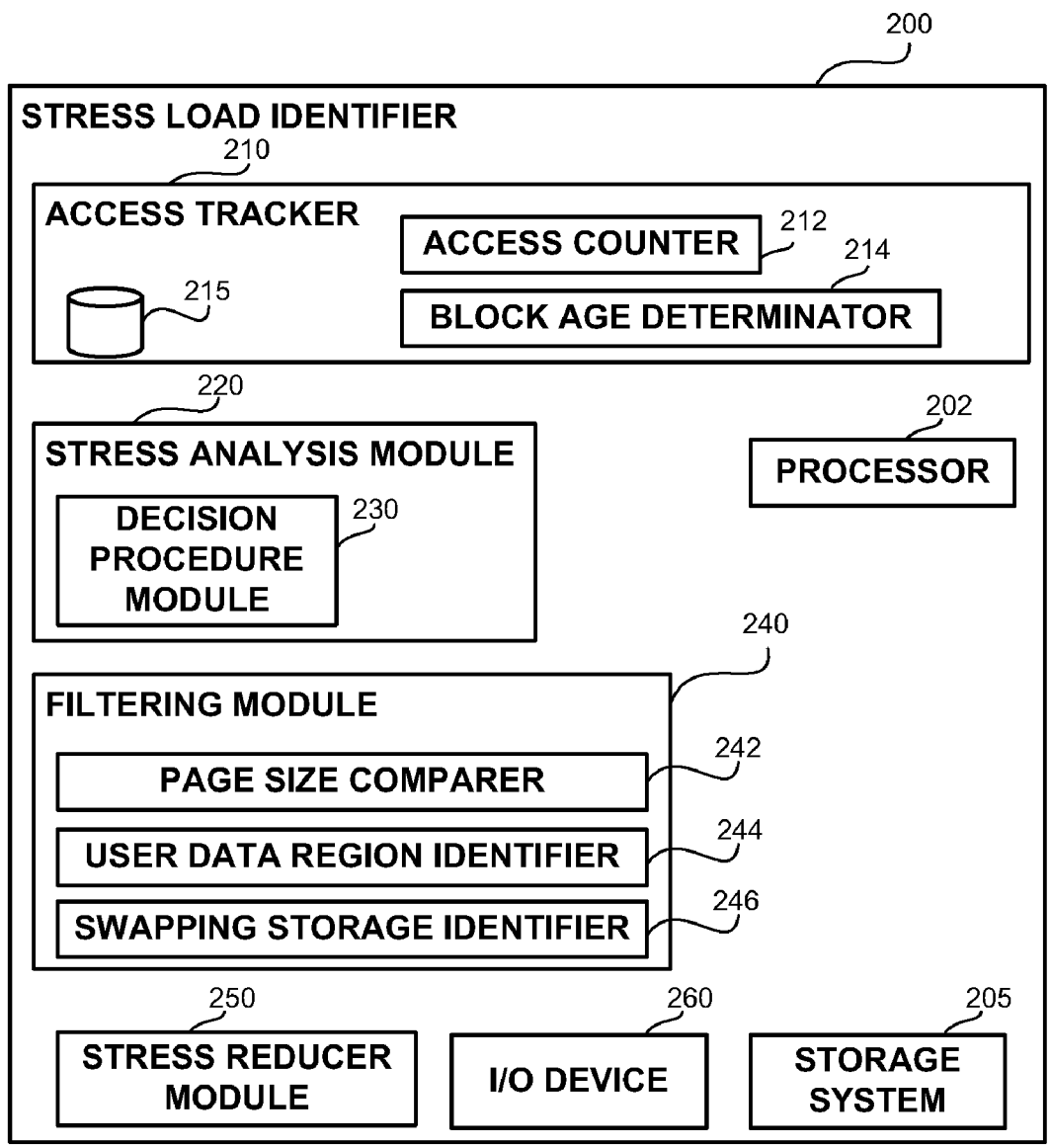
FIG. 2 shows a block diagram of stress load identifier in accordance with some exemplary embodiments of the disclosed subject matter.

Referring now to FIG. 2 showing a block diagram of a stress load identifier in accordance with some exemplary embodiments of the disclosed subject matter. A stress load identifier 200, such as 120 of FIG. 1, may comprise an access tracker 210 and a stress analysis module 220.

The access tracker 210 may track access to a storage system 205, such as 130 of FIG. 1. The access tracker 210 may track retrieval requests, also referred to as read requests, and storage requests, also referred to as write requests, from the storage system 205. The access tracker 210 may comprise a database 215 comprising a temporal indication associated with an access to a data block. A data block may be a basic unit of the storage system 205, such as 512 Bytes. A temporal indication may be a timestamp of a modification time of the data block. The modification time may be a time in which the data block was written, in response to a storage request. The temporal indication may be indicative of a frequency of modification of the data block. In some exemplary embodiments, the database 215 may be comprised by the storage system 205. The database 215 may utilize a sparse format, such as a hash table. The database 215 may comprise information associated with a predetermined set of data blocks, such as for example data blocks that may be used for swapping. The database 215 may be embedded in existing data structures, such as page maps.

In some exemplary embodiments, the access tracker 210 may comprise an access counter 212. The access counter may count a number of accesses to the storage system 205. The access counter may count a number of accesses of a predetermined type, such as a read request, a write request or the like.

In some exemplary embodiments, the access tracker 210 may comprise a block age determinator 214. The block age determinator 214 may determine an age of a data block that is retrieved. An age of a data block may be an amount of time passed between storage of the data block and retrieval of the data block. The age may be counted in seconds, milliseconds, minutes, transaction counts, computation progress or other monotonically-increasing measures. The block age determinator 214 may determine an age of the block based on a temporal indication associated with the block in the database 215.

In some exemplary embodiments, the stress load identifier 200 may comprise a processor 202. The processor 202 may be a Central Processing Unit (CPU), a microprocessor, an electronic circuit, an Integrated Circuit (IC) or the like. The processor 202 may be utilized to perform computations required by the stress load identifier 200 or any of it subcomponents. In some exemplary embodiments, the stress load identifier 200 may be comprised by another computerized device, such as a client 110 of FIG. 1, a platform virtualization 117 of FIG. 1, a storage system 130 of FIG. 1 or the like. The stress load identifier 200 may utilize a processor (not shown) in the another computerized device comprising the stress load identifier 200.

In some exemplary embodiments, the stress load identifier 200 may comprise an Input/Output (I/O) device 260. The I/O device 260 may provide an interface to the storage system 205. The I/O device 260 may provide an interface to a user (not shown) enabling the stress load identifier 200 to provide a notification to the user. The I/O device 260 may be utilized to receive, retrieve or otherwise obtain an access request to the storage device 205 such as a storage request or a retrieval request. In some exemplary embodiments, the I/O device 260 may provide an Application Programming Interface (API) to be utilized by external devices to communicate with the stress load identifier 200. In some exemplary embodiments, the I/O device 260 may utilize an API of external devices.

In some exemplary embodiments, the stress load identifier 200 may comprise a filtering module 240. The filtering module 240 may be configured to identify an access request that is not associated with a swapping activity. The filtering module 240 may be utilized to enable the access tracker 210 to track only a portion of the access requests by filtering out access requests that are determined by the filtering module 240 to not be associated with a swapping activity.

In some exemplary embodiments, the filtering module 240 may comprise a page size comparer 242 which may be configured to compare an access request to a size of a page. For example, in case a size of a page is 4K, any access to the storage device 205 which is associated with a number of data blocks that does not summarize to 4K, 8K, 12K or other product of 4K may be considered to not be associated with a swapping activity. It will be noted that a swapping activity may be retrieval of one or more pages, storage of one or more pages or the like.

In some exemplary embodiments, the filtering module 240 may comprise a user data region identifier 244 which may be configured to identify an access to a user data region. A user data region may be predetermined, such as for example data blocks not associated with a swapping storage or identified on the fly, such as for example, data blocks that were stored in a storage request that was determined not to relate with a swapping activity by the filtering module 240. A user data region may be a partition of the storage system 205, a portion of a file system or the like.

In some exemplary embodiments, the filtering module 240 may comprise a swapping storage identifier 246. The swapping storage identifier 246 may be configured to identify a data block that is associated with a swapping storage. In some exemplary embodiments, a swapping partition may be utilized such as the case with Linux OS. In another exemplary embodiment, pages may be retained in a swapping file and therefore may be identified, such as the case with Microsoft's Windows XP OS.

In some exemplary embodiments, the stress load identifier 200 may comprise a stress analysis module 220 configured to determine a stress level based on a performance of the storage system 205. The stress level may be determined as thrashing. The stress level may be determined as non-thrashing. The stress level may be a numeric value, such as for example a value between zero and one, representing a magnitude of stress. For example, a stress level equal to one may represent a highest possible stress level. A stress level equal to zero may represent a lowest possible stress level. Other metrics may be utilized to indicate a stress level. In some exemplary embodiments, the stress level may be determined based on an average age of retrieved data blocks from the storage system 205. In some exemplary embodiments, retrieving data blocks with a low age, such as of a few seconds, may be indicative of a relatively high magnitude of stress. For example, in case a swapping mechanism causes thrashing, pages may be written to the secondary storage and read from the secondary storage in a short time interval. In some exemplary embodiments, the stress level may be determined based on a count of number of accesses to the storage system 205. For example, during thrashing, multiple accesses to the storage system 205 may be performed in order to either store a page or retrieve a page.

In some exemplary embodiments, a decision procedure module 230 may be utilized to determine the stress level. The decision procedure module 230 may apply a decision procedure to determine the stress level. The decision procedure may be for example a decision tree, a regression analysis, support vector machines, based on a nearest-neighbor method, Kalman filter, clustering or the like. The decision procedure may be predetermined or determined during an operation of the stress load identifier 200 during, for example, a training phase of a machine learning algorithm. An exemplary decision procedure may be a decision tree which requires the access count to be above a predetermined count, such as for example seven hundred and ten accesses, and the average age to be below a predetermined age, such as for example sixty six seconds in order for the decision procedure to determine that the stress level is a high stress level or that thrashing is taking place. In case the count is below the predetermined count or the age is above the predetermined age, the decision procedure may determine that the stress level is a low stress level.

In some exemplary embodiments, a stress reducer module 250 may be configured to perform an action in order to reduce the stress level. The stress reducer module 250 may be configured to perform the action in response to a determination by the stress analysis module 220 of a stress level above a predetermined threshold. The stress reducer module 250 may reboot a client, a portion of a client, such as a virtual OS, an application, a process or the like. The stress reducer module 250 may shut down a client or a portion thereof. The stress reducer module 250 may allocate additional resources to a client, such as for example an additional RAM or other primary memory resource.

In some exemplary embodiments, the storage system 205 may be further comprised by the stress load identifier 200.

Figure 3:
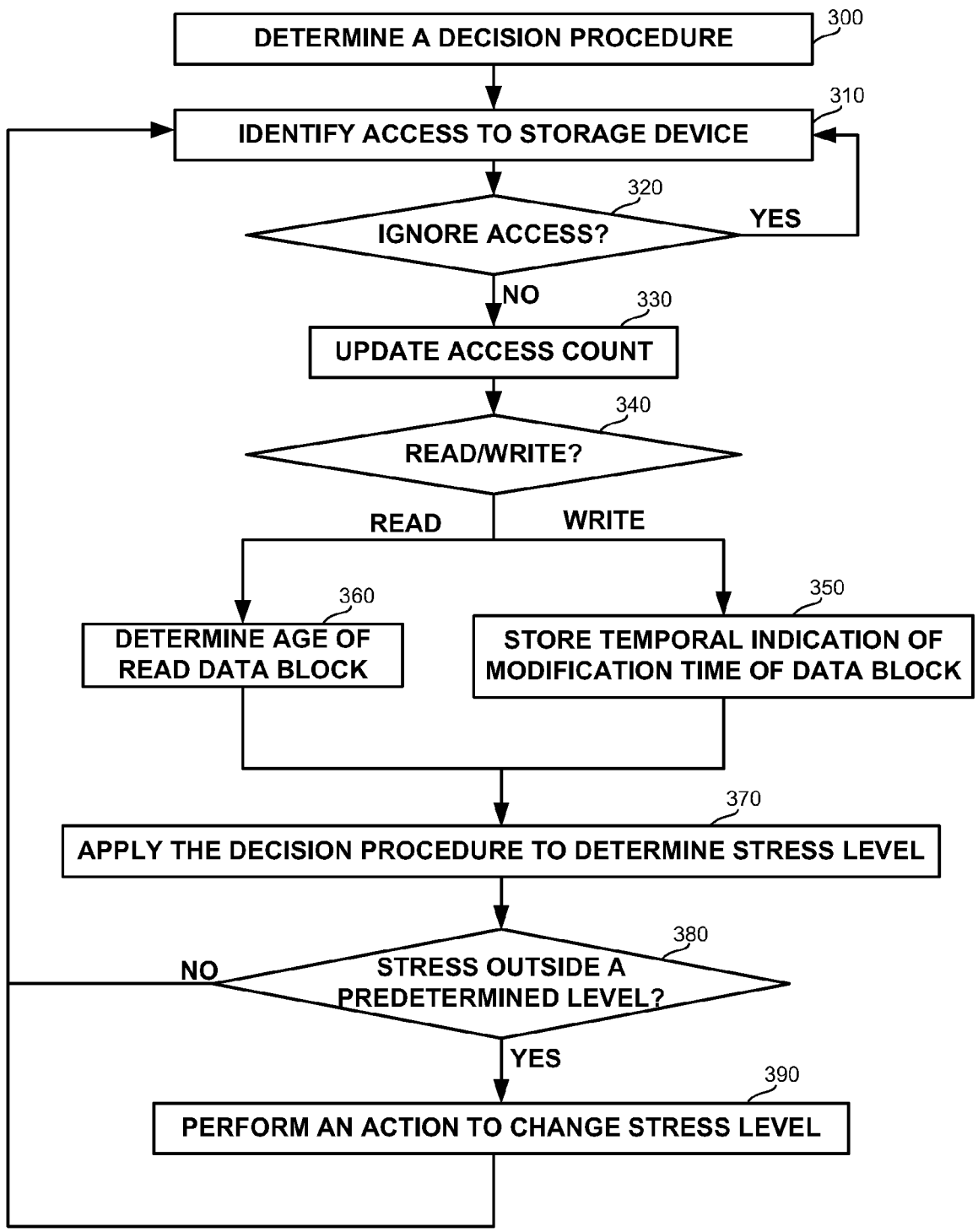
FIG. 3 shows a flowchart diagram of a method in accordance with some exemplary embodiments of the disclosed subject matter.

Referring now to FIG. 3 showing a flowchart diagram of a method in accordance with some exemplary embodiments of the disclosed subject matter.

In step 300, a decision procedure may be determined. The decision procedure may be determined by a decision procedure module, such as 230 of FIG. 2. The decision procedure may be determined based on user preferences, commands, arguments, parameters or the like. The decision procedure may be predetermined. The decision procedure may be determined by a machine learning algorithm, such as for example regression analysis, support vector machines, nearest-neighbor methods, Kalman filters, clustering and the like.

In step 310, an access to a storage device is identified. The access may be identified by an access tracker, such as 210 of FIG. 2.

In step 320, a determination whether or not to ignore the access is made. The determination may be made by a filtering module, such as 240 of FIG. 2. An access to a portion of the storage system that is not associated with a swapping activity may be ignored. It will be noted that the determination may be an approximate determination such that some accesses that are not associated with a swapping activity are not ignored. In a exemplary embodiment, an access which is associated with a swapping activity is never ignored. In case a determination to ignore the access is made, step 31 is performed. otherwise, step 330 is performed.

In step 330, an access count is updated. The access count may be updated by an access counter, such as 212 of FIG. 2. The access count may be incremented by one. In some exemplary embodiments, several access counts may be maintained, such as a storage access count and a retrieval access count.

In step 340, the access may be classified. The access may be classified to either a read access or a write access. The access may be classified by the access tracker. In response to classifying the access as a read access step 360 may be performed. In response to classifying the access as a write access step 350 may be performed.

In step 350, a temporal indication of modification time of a data block may be stored. The temporal indication may be stored in a database, such as 215 of FIG. 2. The temporal indication may be determined and stored by the access tracker. The temporal indication may be a modification time. It will be noted that in some exemplary embodiments, an access may be associated with more than one data block. A sparse database may be utilized to store a single temporal indication to the more than one data block.

In step 360, a determination of an age of the data block accessed may be made. The determination may be made by a block age determinator, such as 214 of FIG. 2. The determination may be based on the temporal indication stored in the database. The determination may be made to average age of data blocks associated with the write access. In some exemplary embodiments, an average age of data blocks retrieved in a timeframe is determined.

In step 370 a decision procedure is applied to determined a stress level. Step 370 may be performed by a decision procedure module, such as 230 of FIG. 2.

In step 380 the stress level is compared to a threshold. In some exemplary embodiments, in case the stress level is outside a predetermined level, such as for example above a predetermined level, such as for example in case the stress level is indicative of thrashing, step 390 may be performed. In case the stress level is below the threshold, step 310 may be performed in response to another access to the storage system. The 380 may be performed by the stress analysis module or by a stress reducer module, such as 250 of FIG. 2.

In step 390, an action to change the stress level may be taken. The action may be performed by the stress reducer module. The action may be intended to reduce the stress level. The action may be effective in some cases. For example, an action which in some cases may reduce the stress level may be taken, even if in effect the action may not reduce the stress level. In some exemplary embodiments, a notification may be provided to notify a user that a system may be under stress, such as for example the system is thrashing. In response to performing step 390, step 310 may be performed once more, in case that an additional storage access is performed.

In some exemplary embodiments, the disclosed subject matter may be utilized in respect to a single client. For example, an average age of data blocks may be determined in respect to data blocks accessed by the client; a count access may account for a number of accesses of the client to the storage system and the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus having a processor comprising:
   an access tracker configured to retain a temporal indication associated with an access to a storage system; and
   a stress analysis module configured to automatically indicate a stress level of the storage system, said stress analysis module utilizes the temporal indication retrained by said access tracker.

2. The computerized apparatus of claim 1 further comprising the storage system.

3. The computerized apparatus of claim 1 further comprising a platform virtualization, and wherein said platform utilization is configured to utilize the storage system.

4. The computerized apparatus of claim 1, wherein the temporal indication comprises a timestamp associated with a storage time of the storage system.

5. The computerized apparatus of claim 1, wherein said stress analysis module comprising a decision procedure module configured to determine the stress level.

6. The computerized apparatus of claim 1, wherein said access tracker comprises an access counter and a block age determinator.

7. The computerized apparatus of claim 1, wherein the stress level is selected from a group consisting of thrashing and non-thrashing.

8. The computerized apparatus of claim 1 further comprising a filtering module configured to identify an access to the storage system which is associated with a non-swapping activity.

9. The computerized apparatus of claim 8, wherein said filtering module comprising at least one component select from the group consisting of a page size comparer, a swapping storage identifier and a user data region identifier.

10. The computerized apparatus of claim 1 further comprising a stress reducer module configured to reduce stress from the storage system.

11. The computerized apparatus of claim 1 further comprising an output module configured to provide an output to a user indicating the stress level determined by said stress analysis module.

12. A method in a computerized environment comprising a storage system, said method comprising:
retaining a temporal indication associated with a write access to the storage system;
identifying a read access to the storage system, the read access having a time of read access;
determining a stress level of the storage system based on the time of read access and the temporal indication; and
outputting an indication associated with the stress level
whereby the write access and the read access are transformed to the stress level, the stress level is indicative of a likelihood of thrashing of a computerized device utilizing the storage system.

13. The method of claim 12, wherein:
the write access is associated with an at least one data block;
the read access is associated with a portion of the at least one data block; and
the storage system comprising the at least one data block.

14. The method of claim 12, wherein said determining the stress level comprises:
determining a decision procedure; and
applying the decision procedure.

15. The method of claim 12, wherein said determining the stress level comprises determining an age associated with the portion of the storage system.

16. The method of claim 12, wherein said determining the stress level comprises counting a number of accesses to the storage system.

17. The method of claim 12 further comprises performing an action to reduce the stress level.

18. The method of claim 17, wherein the action is selected from a group consisting of rebooting the computerized device, shutting a process associated with the computerized device, adding resources to the computerized device and suspending the process associated with the computerized device.

19. The method of claim 12, wherein the read access and the write access have a potential of being associated with an at least one swapping operation.

20. A computer program product comprising:
a computer readable medium;
a first program instruction for retaining a temporal indication associated with a write access to the storage system;
a second program instruction for identifying a read access to a storage system, the read access having a time of read access; and
a third program instruction for determining a stress level of the storage system based on the time of read access and the temporal indication
wherein said first, second and third program instructions are stored on said computer readable medium.

21. The computer program product of claim 20 further comprising a fourth program instruction for outputting an indication associated with the stress level, wherein said fourth program instruction is stored on said computer readable medium.

22. The computer program product of claim 20, wherein said third program instruction comprising:
a fourth program instruction for determining a decision procedure; and
a fifth program instruction for applying the decision procedure.

23. The computer program product of claim 20, wherein said third program instruction comprising a fourth program instruction for determining an age associated with the portion of the storage system.

24. The computer program product of claim 20, wherein said third program instruction comprising a fourth program instruction for counting a number of accesses to the storage system.

25. A computerized apparatus having a processor, wherein said computerized apparatus is coupled to a storage system, the storage system is utilized by a platform virtualization, said computerized apparatus comprising:
an access tracker configured to retain a temporal indication associated with a first access to the storage system, wherein the temporal indication comprises a timestamp associated with a storage time of the storage system, wherein said access tracker comprising an access counter and a block age determinator;
a filtering module configured to identify a second access to the storage system which is associated with a non-swapping activity, wherein said filtering module is utilized by said access tracker, said filtering module comprising:
a page size comparer;
a swapping storage identifier; and
a user data region identifier;
a stress analysis module configured to automatically indicate a stress level of the storage system, said stress analysis module utilizes the temporal indication retrained by said access tracker, wherein said stress analysis module comprising a decision procedure module configured to determine the stress level;
a stress reducer module configured to reduce stress from the storage system; and
an output module configured to provide an output to a user indicating the stress level determined by said stress analysis module.

* * * * *